Patented Sept. 27, 1932

1,879,541

UNITED STATES PATENT OFFICE

WERNER SCHULEMANN, OF VOHWINKEL, NEAR ELBERFELD, FRITZ MIETZSCH, OF ELBERFELD, GERMANY, AND AUGUST WINGLER, OF WESTFIELD, NEW JERSEY, ASSIGNORS TO WINTHROP CHEMICAL COMPANY, INC., OF NEW YORK, N. Y., A CORPORATION OF NEW YORK

COMPOUNDS OF THE OXAZINE SERIES

No Drawing. Application filed November 15, 1929, Serial No. 407,558, and in Germany September 11, 1924.

The present invention relates to new compounds of the oxazine series, more particularly it relates to oxazine compounds, being at least once substituted in the benzene nuclei by a substituent of the general formula:

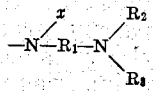

wherein $x$ stands for hydrogen, or, for example, an alkyl group, an aminoalkyl group, or substituted aminoalkyl group, such as a mono-alkylaminoalkyl group or dialkylaminoalkyl group, $R_1$ stands for an alkylene residue, in which the hydrogen atoms may be substituted by monovalent substituents, for example, by the hydroxy group, $R_2$ and $R_3$ stand for alkyl groups which may be substituted, for example by the amino group, and wherein the oxazine nucleus may be further substituted, for example, by alkyl, alkoxy, phenyl, halogen and the like.

The manufacture of our new compounds can be effected in several ways; for instance an amino derivative of an oxazine may be caused to be acted upon by an aminoalkyl halide having the general formula:

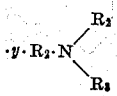

wherein $y$ represents a halogen atom, $R_1$ an alkylene residue, the hydrogen atoms of which may be replaced by a monovalent substituent, such as the hydroxy group, $R_2$ and $R_3$ stand for hydrogen or alkyl groups which may be substituted, for example, by amino groups.

Instead of the aminoalkyl halide one may use in this process the salt of an aminoalkyl halide with an inorganic acid of a substitution product of the aminoalkyl halide, such as the bromoethylphthalimide. In the last case phthalic acid is to be split off subsequently.

The manufacture of our new compounds can be furthermore effected by converting such amino compounds as are suitable intermediate products for the manufacture of amino derivatives of the oxazine into aminoalkylamino derivatives and subsequently transforming the latter into the corresponding oxazine compounds according to known methods. We are aware of the fact that several other methods for preparing our new compounds are obvious which, however, we do not mention specifically.

The new oxazine derivatives are generally blue products of a low melting point they are generally sparingly soluble in water and soluble in organic solvents; they yield, with inorganic acids, water soluble salts and are pharmaceutically valuable products.

The following examples illustrate our invention, without restricting it thereto:

Example 1

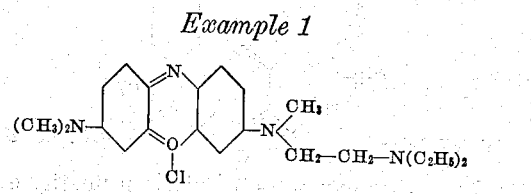

meta-hydroxy-N-(diethylaminoethyl-methyl)-aminobenzene is prepared from meta-hydroxy-N-methyl-aminobenzene and diethylaminoethylchloride in benzene and forms, at normal temperature, a viscous, highly refractive colorless oil, boiling at 156.5–157.5° C. under a pressure of 1 mm.

For the production of the dyestuff of the above formula 22.2 parts by weight of this base are heated to boiling in 50 parts by weight of glacial acetic acid, 10 parts of water and 20 parts by weight of concentrated hydrochloric acid. The boiling mixture is well stirred and 28 parts by weight of the hydrochloride of para-nitroso-dimethylaniline are gradually introduced, the reaction being completed by further heating for some time. The mixture is then diluted with water and on the addition of zinc chloride solution the crystalline zinc double salt is precipitated. The same is freed from by-products by redissolving and fractionally precipitating with zinc chloride solution. After the elimination of the zinc by means of sodium carbonate solution and subsequent drying in vacuo, a bronze colored powder is obtained which rapidly dissolves in water with a pure blue coloration.

*Example 2*

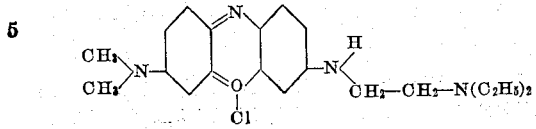

22.2 parts by weight of meta-hydroxy-N-(diethylaminoethyl)-aminobenzene, being an oil boiling at 156–157° C. under a pressure of 1 mm. and being obtainable from meta-aminophenol and diethylaminoethylchloride, are mixed with 50 parts by weight of glacial acetic acid in 10 parts by weight of water and 20 parts by weight of concentrated hydrochloric acid. The mixture is heated to boiling, 28 parts by weight of para-nitrosodimethylaniline hydrochloride are added and heating is continued for some hours. The mixture is diluted with water and the dyestuff is precipitated with a zinc chloride solution. The zinc chloride double salt thus obtained is redissolved and freed from zinc by means of sodium carbonate. The hydrochloric acid salt is a bronze-like powder soluble in water with a blue coloration.

*Example 3*

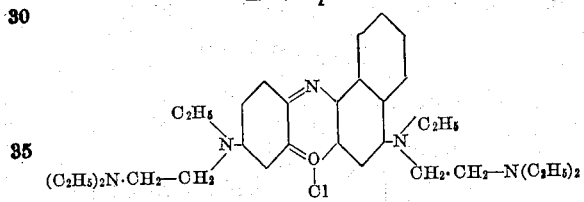

Meta-hydroxy-N-(diethylaminoethylethyl)-aminobenzene is prepared by heating meta-hydroxy-N-ethylaminobenzene and diethylaminoethylchloride in benzene. The new base is obtained in the form of viscous oil having a boiling point of 160° C. under a pressure of 1 mm. which after some time solidifies to a crystalline mass.

Alpha-N-(diethylaminoethyl-ethyl)-aminonaphthalene is prepared by heating alpha-N-ethylaminonaphthalene and diethylaminoethylchloride in benzene. The new base is obtained in the form of a thinly liquid oil of a boiling point of 173–176° C. under a pressure of 1 mm.

17.7 grams of meta-hydroxy-N-(diethylaminoethyl-ethyl)-aminobenzene are dissolved in 22.5 ccm. of 10H-hydrochloric acid and 5.25 grams of sodium nitrite in concentrated aqueous solution are added. A strongly yellow-colored concentrated solution of the nitroso-compound is obtained. This solution is slowly added, drop by drop, to a boiling solution of 13.5 grams of alpha-N-(diethylaminoethyl-ethyl)-aminonaphthalene in 30 grams of glacial acetic acid and 5 grams of concentrated hydrochloric acid. The mixture is boiled for ½ hour. The dyestuff is isolated by salting out with sodium nitrate, and is purified by redissolving in water and precipitating by the addition of sodium nitrate.

This application is a continuation in part of our application Ser. No. 52,228, filed August 24, 1925 (U. S. Patent No. 1,766,403).

We claim:

1. As new products, the oxazine compounds of the probable general formula:

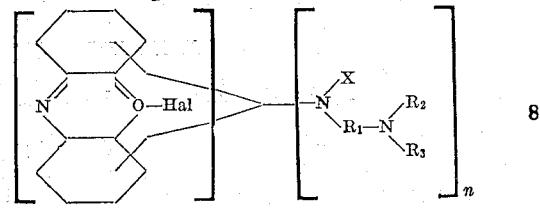

wherein X stands for a substituent of the group consisting of hydrogen, alkyl, $R_1$ stands for an ethylene radical which may be substituted by hydroxyl groups, and $R_2$ and $R_3$ stand for ethyl groups which may be substituted by the amino group, "$n$" stands for one of the numbers one and two, and wherein the nuclei may be further substituted, by a substituent of the group consisting of phenyl, halogen and the dimethylamino group, said compounds being soluble in water.

2. As a new product, the oxazine compound of the following probable formula:

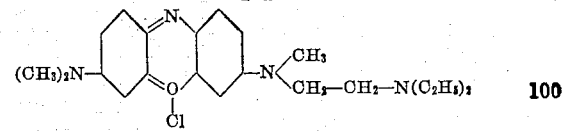

being a bronze colored powder, soluble in water with a blue coloration.

3. As new products, the oxazine compounds of the probable general formula:

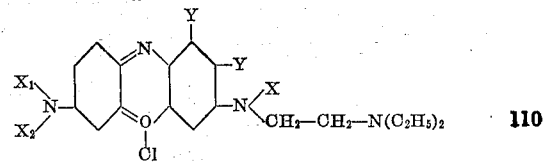

wherein X stands for hydrogen or alkyl, $X_1$ for alkyl, $X_2$ for methyl or the radical $-CH_2-CH_2-N(C_2H_5)_2$, and the Y's represent hydrogen atoms or jointly stand for the grouping

said compounds being soluble in water.

4. As a new product, the oxazine compound of the probable formula:

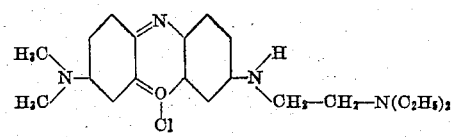

being a bronze-like powder, soluble in water with a blue coloration.

5. As a new product, the oxazine compound of the probable formula:

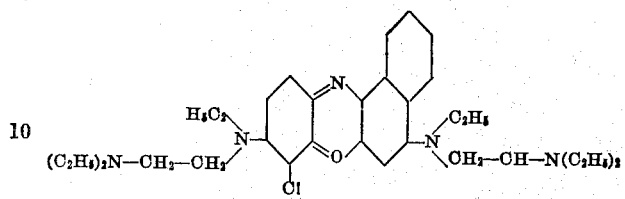

being soluble in water with a blue coloration.

6. As new products, the oxazine compounds of the probable general formula:

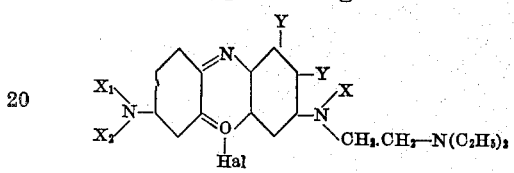

wherein X stands for hydrogen or alkyl, $X_1$ stands for alkyl, $X_2$ for methyl or the diethylamino ethyl group, and the Y's represent hydrogen atoms or jointly stand for the grouping

said compounds being soluble in water.

In testimony whereof, we hereunto set our hands and affix our seals.

WERNER SCHULEMANN. [L. S.]
FRITZ MIETZSCH. [L. S.]
AUGUST WINGLER. [L. S.]